(12) United States Patent
Sunne et al.

(10) Patent No.: US 9,709,699 B2
(45) Date of Patent: Jul. 18, 2017

(54) NANO-NANO-COMPOSITE OPTICAL CERAMIC LENSES

(75) Inventors: Wayne L. Sunne, Tucson, AZ (US); Jacob A. Hanson, Oro Valley, AZ (US); Eric C. Fest, Tucson, AZ (US); Ronald L. Roncone, Vail, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 67 days.

(21) Appl. No.: 13/365,588

(22) Filed: Feb. 3, 2012

(65) Prior Publication Data

US 2013/0342921 A1    Dec. 26, 2013

(51) Int. Cl.
| | |
|---|---|
| *G02B 1/00* | (2006.01) |
| *G02B 9/10* | (2006.01) |
| *G02B 5/10* | (2006.01) |
| *G02B 7/02* | (2006.01) |
| *B82Y 20/00* | (2011.01) |

(52) U.S. Cl.
CPC ............... *G02B 1/00* (2013.01); *B82Y 20/00* (2013.01); *G02B 5/10* (2013.01); *G02B 7/028* (2013.01); *G02B 9/10* (2013.01); *G02B 2207/101* (2013.01); *Y10S 977/811* (2013.01); *Y10S 977/833* (2013.01); *Y10S 977/834* (2013.01)

(58) Field of Classification Search
CPC .... G02B 5/0287; G02B 7/10; G02B 13/0035; G02B 9/16; G02B 7/02; G02B 7/028; G02B 5/0278; G02B 1/00; G02B 9/10; G02B 5/10; G02B 2207/101; B82Y 10/00; B82Y 20/00; B82Y 30/00; B82Y 35/00; Y10S 977/811; Y10S 977/833; Y10S 977/843

USPC ............... 359/599, 601, 703, 785, 819, 820; 977/833, 834, 868, 954, 955
See application file for complete search history.

(56) References Cited

U.S. PATENT DOCUMENTS

| | | |
|---|---|---|
| 3,898,051 A | 8/1975 | Schmid |
| 4,291,848 A | 9/1981 | Clark |
| 6,710,366 B1 | 3/2004 | Lee et al. |
| 7,029,613 B2 | 4/2006 | Wan et al. |
| 7,335,865 B2 | 2/2008 | Tibi et al. |
| 7,499,618 B2* | 3/2009 | Mataki ................ C08K 3/0008 385/129 |
| 2005/0042453 A1* | 2/2005 | James et al. .................. 428/403 |
| 2009/0283720 A1 | 11/2009 | Sweeney et al. |
| 2009/0323178 A1* | 12/2009 | Plummer ...................... 359/356 |
| 2011/0315807 A1 | 12/2011 | Sunne |

OTHER PUBLICATIONS

Londono et al "Athermalization of a single-component lens with diffractive optics"; Applied Optics vol. 32, No. 13, May 1993, p. 2295-2302.*
Stefanik, Todd et al., "Nanocomposite Optical Ceramics for Infrared Windows and Domes", Proceedings of SPIE, vol. 6545, 2007, pp. 65450A-1-65450A-5.

* cited by examiner

*Primary Examiner* — Jie Lei
(74) *Attorney, Agent, or Firm* — Lando & Anastasi, LLP (57) ABSTRACT

An optical component, for example a lens, integrally formed of a nano/nano class nanocomposite optical ceramic (NN-COC) material. The constituent nanograin materials of the NNCOC material are selected to tailor the thermal and optical properties of the lens so as to provide a lens with a substantially constant focal length over an operating temperature range and/or an optical system in which the image position does not change appreciably over the operating temperature range.

16 Claims, 10 Drawing Sheets

NANO-NANO-COMPOSITE OPTICAL CERAMIC LENSES

BACKGROUND

The focal length of lenses can vary significantly when subjected to temperature fluctuations. Germanium is a common material used in lenses operating in the infrared wavelengths due to its high refractive index and low dispersion. However, Germanium is very temperature dependant, having a thermo-optic coefficient (dn/dT) of nearly 400×10-6/° C., and therefore its performance quickly degrades with increasing temperature, becoming opaque at 100° C. Athermalization is important in optical systems for maintaining focus despite changes in temperature. Accordingly, there have been many attempts to design optical systems that are athermal. In particular, one approach is to design optical mounts and systems to compensate for the changing thermo-optic properties of the lenses.

SUMMARY OF INVENTION

Aspects and embodiments are directed to athermal lens, reflective optical device and optical system designs in which the properties of the lens (and optionally other components of the optical system) are tailored to compensate for the temperature-induced changes in the focal length of the system. Certain aspects and embodiments are further directed to materials which may provide achromatization in optical systems, as discussed further below.

One embodiment is directed to a lens having a focal length that is substantially constant over an operating temperature range, the lens being integrally formed of a nano-nano composite optical ceramic (NNCOC) material comprising at least two different component nanograin materials, each nanograin material having a sub-micron grain size in a direction of light transmission through the lens, and a volumetric ratio of the at least two different nanograin materials in the nano-nano composite optical ceramic material being selected to provide the substantially constant focal length of the lens.

In one example, the NNCOC material is substantially transparent in the infrared spectral band. In another example, the at least two different component nanograin materials are selected from a group consisting of Zinc sulfide (ZnS), Magnesium oxide (MgO) diamond, silica, Beryllium oxide (BeO), Aluminum oxide ($Al_2O_3$), Yttrium oxide ($Y_2O_3$), spinel, Aluminum oxynitride (ALON), Zirconium oxide ($ZrO_2$), $ZrO_2$—$Y_2O_3$, Magnesium fluoride ($MgF_2$), Strontium fluoride ($SrF_2$), quartz, Calcium Fluoride ($CaF_2$) and Potassium chloride (KCl). In another example, the at least two different component nanograin materials include Magnesium oxide (MgO) and Zirconium oxide ($ZrO_2$). In one example, the volumetric fraction of MgO is approximately 81%. The NNCOC material may consist of the at least two different component nanograin materials with no host matrix material, and the sub-micron gains size of each component nanograin material may be less than approximately one tenth of a wavelength of light transmitted by the lens. In one example, the sub-micron grain size of each component nanograin material is approximately 100 nanometers.

According to another embodiment, an optical system comprises a lens comprising a nano-nano-composite optical ceramic material including at least two different component nanograin materials, each nanograin material having a sub-micron grain size in a direction of light transmission through the lens, and a mount configured to hold the lens.

In one example, the mount has a first coefficient of thermal expansion, and a volumetric ratio of the at least two different component nanograin materials is selected to provide the lens with a thermo-optic coefficient that is substantially equal and opposite to the first coefficient of thermal expansion. In another example, the mount comprises Aluminum and the at least two different component nanograin materials are Calcium Fluoride ($CaF_2$) and Magnesium Fluoride ($MgF_2$). In one example, a volumetric fraction of Calcium Fluoride is approximately 38%. In another example, a volumetric ratio of the at least two different nanograin materials in the nano-nano composite optical ceramic material is selected to provide a substantially constant focal length for the lens over an operating temperature range of the optical system. The nano-nano-composite optical ceramic material may be substantially transparent in the infrared spectral band.

According to another embodiment, a method of producing a lens from a nano-nano-composite optical ceramic powder comprises acts of determining a desired thermo-optic coefficient of the lens, selecting at least two different component nanograin materials and a volumetric ratio of the at least two different component nanograin materials to achieve the desired thermo-optic coefficient, combining and processing the at least two different nanograin materials to form the nano-nano-composite optical ceramic powder, and processing the nano-nano-composite optical ceramic powder to form the lens.

In one example of the method determining the desired thermo-optic coefficient of the lens includes determining a coefficient of thermal expansion of a mount configured to hold the lens, and selecting the thermo-optic coefficient to be approximately matched to the coefficient of thermal expansion of the mount. In another example, selecting the at least two different component nanograin materials includes selecting Calcium Fluoride ($CaF_2$) and Magnesium Fluoride ($MgF_2$). In one example, determining the desired thermo-optic coefficient of the lens includes determining the thermo-optic coefficient and a coefficient of thermal expansion of the lens to provide the lens with a substantially constant focal length over an operating temperature range of the lens. In another example, selecting the at least two different component nanograin materials includes selecting Magnesium oxide (MgO) and Zirconium oxide ($ZrO_2$). In another example, combining and processing the at least two different component nanograin materials includes using a flame spray pyrolysis method to form the nano-nano-composite optical ceramic powder.

According to another embodiment, an optical system comprises at least one lens integrally formed of a nano-nano-composite optical ceramic material including at least two different component nanograin materials, each nanograin material having a sub-micron grain size in a direction of light transmission through the at least one lens, wherein volume fractions of the at least two different component nanograin materials are selected to achromatize the optical system over a waveband of interest.

In one example of the optical system, the at least one lens includes two lenses, namely a first positive-powered lens having a first optical power and a second negative-powered lens having a second optical power, an optical power of the optical system being equal to the sum of the first optical power of the first lens and the second optical power of the second lens. The waveband of interest may include at least a portion of the visible spectral band, for example.

According to another embodiment, an optical system comprises at least one lens integrally formed of a nano-nano composite optical ceramic (NNCOC) material comprising at least two different component nanograin materials, each nanograin material having a sub-micron grain size in a direction of light transmission through the at least one lens, and a volumetric ratio of the at least two different nanograin materials in the nano-nano composite optical ceramic material being selected to achieve a substantially constant focal length of the optical system over at least one of a range of operating temperatures and a waveband of interest.

In one example, the at least one lens has a focal length that is substantially constant over the range of operating temperatures and wherein the volumetric ratio of the at least two different nanograin materials is selected to provide the substantially constant focal length of the at least one lens. In another example, the volumetric ratio of the at least two different nanograin materials is selected to achromatize the optical system over the waveband of interest. The at least one lens may include, for example, a first positive-powered lens having a first optical power and a second negative-powered lens having a second optical power, an optical power of the optical system being equal to the sum of the first optical power of the first lens and the second optical power of the second lens. In another example, the optical system further comprises a mount configured to hold the at least one lens. The mount has a first coefficient of thermal expansion, and the volumetric ratio of the at least two different component nanograin materials may be selected to provide the at least one lens with a thermo-optic coefficient that is substantial equal and opposite to the first coefficient of thermal expansion.

According to another embodiment, an optical system comprises at least one reflective optical component integrally formed of a nano-nano composite optical ceramic (NNCOC) material comprising at least two different component nanograin materials, each nanograin material having a sub-micron grain size, and a volumetric ratio of the at least two different nanograin materials in the nano-nano composite optical ceramic material being selected to achieve a substantially constant curvature of a reflective surface of the at least one reflective optical component over a range of operating temperatures of the optical system. In one example, the at least one reflective optical component is a mirror.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral.

For purposes of clarity, not every component may be labeled in every figure. In the figures.

DETAILED DESCRIPTION

As discussed above, athermalization is important in optical systems for maintaining focus despite changes in temperature. In a multi-component optical system, both the lens(es) and the mounting structure may have characteristics that are temperature-dependent. Similarly, reflective optical components, such as mirrors, may also have temperature-dependent characteristics. For example, the coefficients of thermal expansion, $\alpha(T)$, of the lens and the mounting structure may cause these components to vary in physical size with changes in temperature. In addition, the index of refraction, n, of the lens may vary with temperature (dn/dT). The focal length of the lens may thus vary as a function of both the changing index of refraction and $\alpha(T)$. Due to a very limited choice of available lens materials for the mid-wavelength infrared (MWIR) band, athermalizing opto-mechanical systems operating in this band can be difficult. Aspects and embodiments provide a mechanism for tailoring the optical properties of lenses using the thermal properties of the refractive index, n, and thermal coefficient of expansion, $\alpha(T)$ of the constituent materials of the lens, thereby providing athermalization for optical systems, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Nano/Nano class Nanocomposite Optical Ceramics (NNCOCs) are composite materials that are constructed with two or more nano-crystal grain types. NNCOCs have been created by combining Magnesia and Yttria via flame spray pyrolysis and used to enhance mechanical strength and thermal shock resistance in infrared (IR) radomes. Aspects and embodiments are directed to the use of NNCOC materials in infrared lenses, particularly to provide lenses with specified or controlled thermo-optic properties. NNCOC materials may also be used to provide reflective optical devices, such as mirrors, with controlled thermo-optic properties. A NNCOC material comprises two or more types of nanograins dispersed in one another, each nanograin having a sub-micron grain dimension in at least the direction approximately perpendicular to the direction of propagation of the transmitted light. In one example, substantially all of the nanograins have a sub-micron grain dimension in the direction approximately perpendicular to the direction of propagation of the transmitted light (and in some examples, all directions) that is less than approximately one tenth to one twentieth of the wavelength of transmitted light. The different nanograins form material barriers to grain growth of the other, thus strengthening the NNCOC material.

Figure 1A:
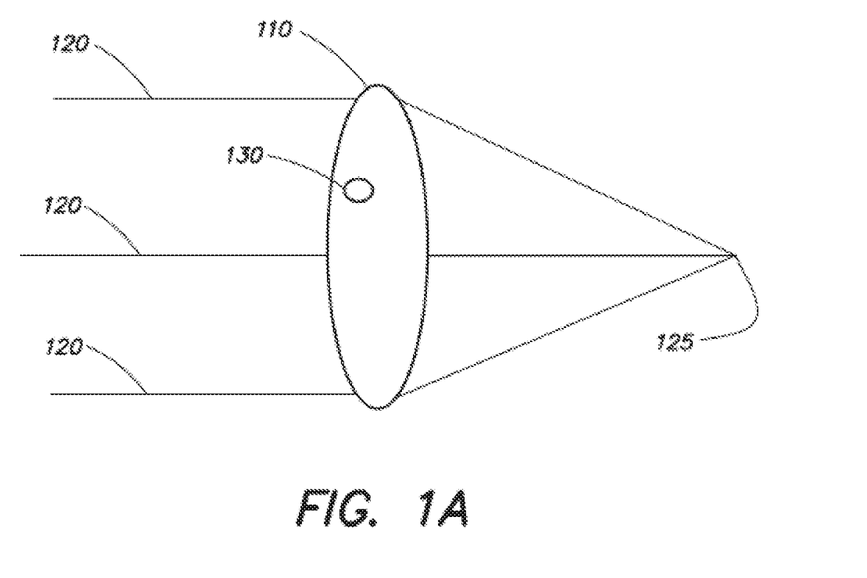
FIG. 1A is a schematic diagram of one example of a NNCOC lens according to aspects of the invention.
Figure 1B:
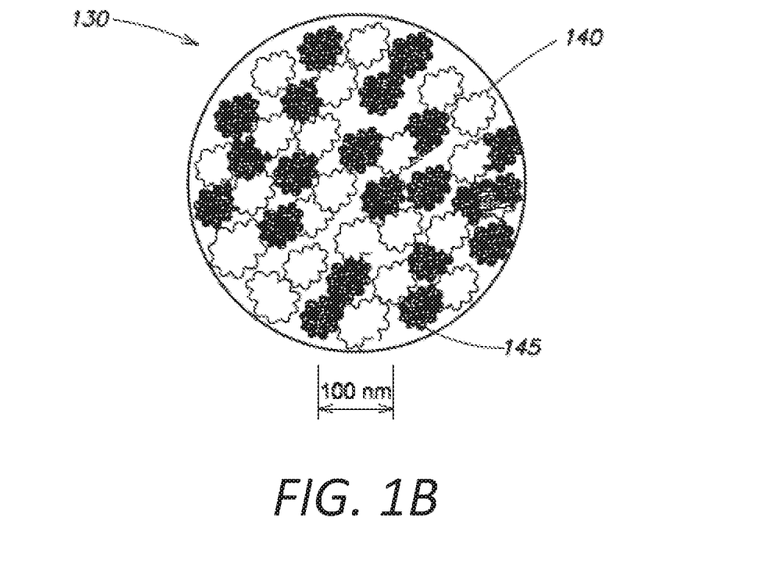
FIG. 1B is an enlarged schematic view of a portion of the lens of FIG. 1A, according to aspects of the invention.

Referring to FIGS. 1A and 1B there is illustrated an example of a lens 110 formed of a NNCOC material. The lens 110 focuses incoming light rays 120 to a focal point 125. As discussed in more detail below, the NNCOC material may be molded and heat-cured from powders to form the lens shape. In one example, this molding process can accommodate the incorporation of particular shapes and/or features into the lens 110. FIG. 1B is an enlarged view of section 130 of the lens 110, showing the NNCOC grain structure. As discussed above, the NNCOC material comprises two different grain types 140, 145, also referred to as NNCOC materials. As discussed further below, the size of the grains 140, 145 that are grown in the NNCOC material may be controlled to remain well below the transmission wavelength of interest (e.g., the infrared band) to minimize interference scattering. In one example, for infrared lens applications, the grains 140, 145 may be less than 100 nm in diameter on average, which allows for good optical, thermal, and mechanical properties. In one example, the lens 110 is formed of a true NNCOC material in that all of the constituent materials have sub-micron grain dimensions, there being no host matrix.

According to one embodiment, the two or more constituent or component nanograin materials are selected from materials which are sufficiently transparent in the wavelength range of interest and which can be processed to retain nanograins of sub-micron size in at least one direction. Example materials include but are not limited to oxides, such as yttria, magnesia, alumina, spinel, and non-oxides, such as carbides (e.g., silicon carbide (SiC)), oxycarbides, nitrides, oxynitrides, borides, oxyborides, sulfides (e.g., zinc sulfide (ZnS)), selenides, and sulfo-selenides, as well as semiconductors, such as silicon and Germanium. The different types of nanograins (component materials) of the NNCOC material may be chosen to be mutually neutral such that they do not react chemically with one another, and having similar refractive indices so as to avoid inter-particle scattering that would degrade optical performance. Examples of the grain materials are discussed in more detail below. According to certain examples, a lens formed of the NNCOC material may be substantially transparent over a portion of the infrared (IR) spectrum including near-IR (wavelengths of approximately 0.75-1.4 micrometers (μm)), short-wavelength IR (approximately 1.4-3 μm), mid-wavelength IR (approximately 3-8.5 μm), and/or long-wavelength IR (approximately 8-12 μm), and/or the visible band (approximately 0.4-0.75 μm).

In one embodiment, the coefficient of thermal expansion, $\alpha(T)$, and the rate of change of index of refraction with temperature, also referred to as the thermo-optic coefficient (dn/dT), of the constituent NCOC materials may be tailored to create a customized optical material using thermal variations. A thermally tailored lens made using NNCOC materials may allow for optical systems whose focal length does not change appreciably with temperature, and optomechanical systems where the image position does not change appreciably with temperature. In addition, customized NNCOC materials may be used and optimized for mounting structures in optomechanical systems.

The change in focal length of a mounted lens, $\Delta f$, is a function of the changing refractive index of the lens and of the thermal expansion coefficients of the lens and the housing, as given by Equation (1):

$$\Delta f = -f * \Delta T \left[ \frac{\left(\frac{dn}{dT}\right)}{(n-1)} - \alpha_L + \alpha_H \right] \quad (1)$$

Figure 2:
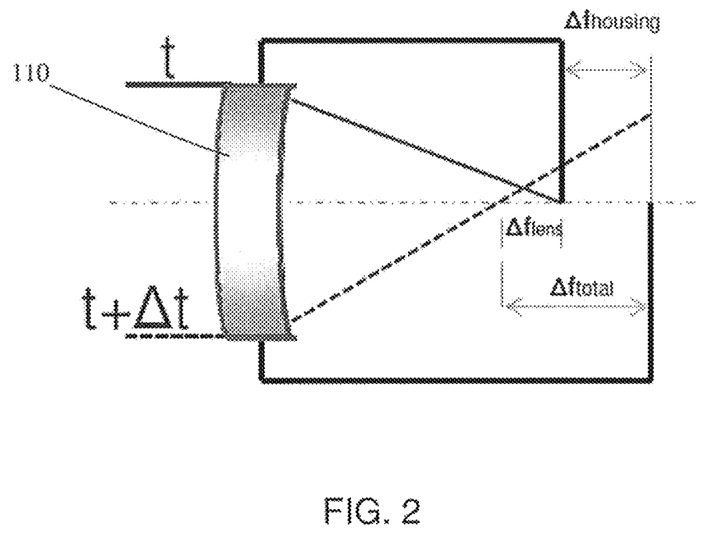
FIG. 2 is a schematic diagram of one example of a mounted lens.

In Equation (1), $\Delta T$ is the change in temperature, n is the refractive index of the lens, $\alpha_L$ is the coefficient of thermal expansion of the lens, and $\alpha_H$ is the coefficient of thermal expansion of the housing. In general, for most infrared materials, the focal length of the lens gets shorter with an increase in temperature, due to a positive dn/dT, and the housing gets longer, as illustrated in FIG. 2. For example, applying Equation (1), a 100 mm effective focal length (EFL) Germanium singlet lens mounted in an Aluminum housing, for a temperature excursion of +20° C., experiences a change in focal length, $\Delta f$, of:

$$\Delta f = -100*20*([(417/(4-1)] - 4.75 + 23)*10^{-6} = 0.315 \text{ mm}$$

By appropriately selecting the constituent NNCOC materials used for the lens 110 and tailoring the coefficients of thermal expansion and thermo-optic coefficients, the lens 110 may be designed to have approximately a zero change in focal length with temperature, at least over an expected operating temperature range, for example, approximately −40 C to +70 C.

Figure 3:
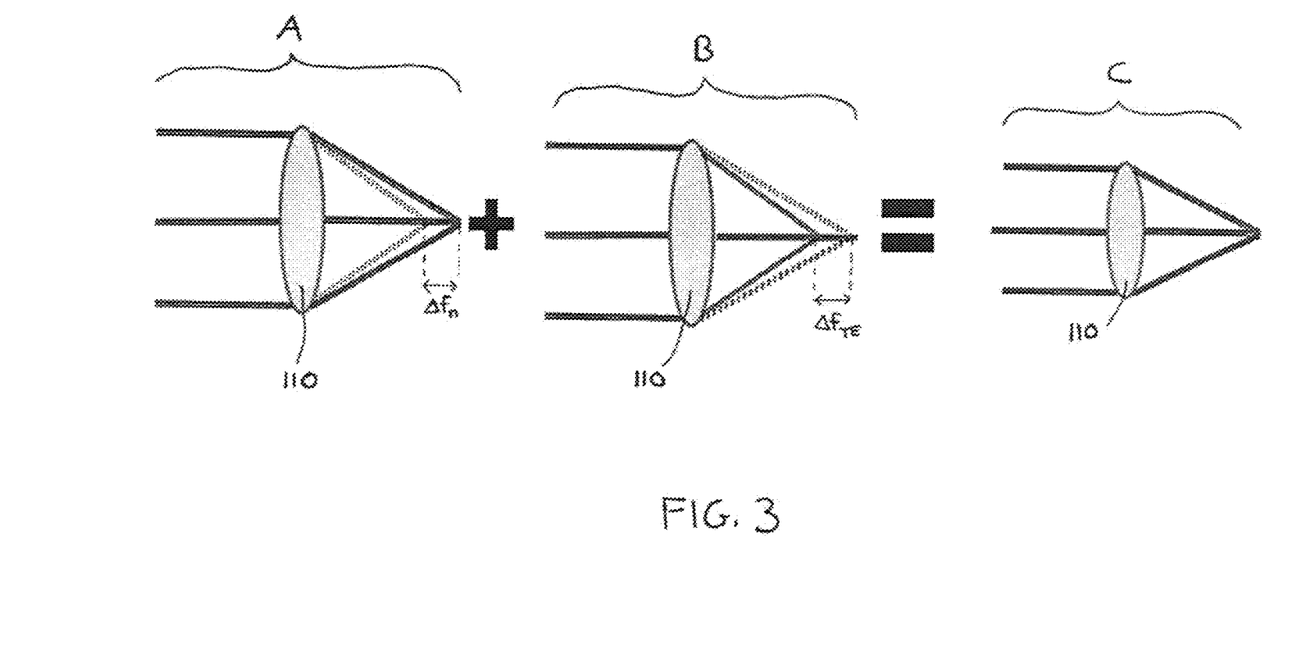
FIG. 3 is a schematic diagram illustrating one example of compensating for the thermal-optic properties of a lens to provide a lens with a temperature-stable focal length, according to aspects of the invention.

For example, referring to FIG. 3, a lens 110 has a nominal focal length at a temperature T=0, represented by the solid lines in FIG. 3. The lens may experience a change in focal length $\Delta f_n$ caused by a temperature-induced change in the refractive index of the lens (as illustrated in panel A in FIG. 3, where the dotted lines represent the changed focal length at some temperature $\Delta T$, and $\Delta f_n$ is the change in focal length). As discussed above, for most infrared materials, the changing refractive index causes the focal length of the lens 100 to get shorter with increasing temperature (df/dT<0), as illustrated. Similarly, the coefficient of thermal expansion causes a change in focal length $\Delta f_{TE}$, as illustrated in panel B of FIG. 3 (again, the dotted lines represent the focal length at $\Delta T$). In the illustrated example, the coefficient of thermal expansion causes the focal length of the lens to increase (df/dT>0). By appropriately designing the NNCOC material of the lens 110, as discussed further below, the change in focal length $\Delta f_{TE}$ due to $\alpha(T)$ can be used to compensate for the change in focal length $\Delta f_n$ due to dn/dT (or vice versa), resulting in the lens 100 having an overall net zero (or close to zero) change in focal length with temperature, as shown in panel C in FIG. 3 where df/dT~0.

According to one embodiment, based on theoretical model, the properties of NCOC materials, such as the index of refraction (n), thermo-optic coefficient (dn/dT), and coefficient of thermal expansion ($\alpha(T)$), are predicted to be a linear weighted average of the properties of the constituent materials, at least over expected temperature ranges of interest. Therefore, for a two-component NNCOC comprising materials $C_1$ and $C_2$, $$n = (\% C_1 * n_1) + (\% C_2 * n_2) \tag{2}$$

$$dn/dT = \% C_1 * (dn_1/dT) + \% C_2 * (dn_2/dT) \tag{3}$$

$$\alpha = (\% C_1 * \alpha_1) + (\% C_2 * \alpha_2) \tag{4}$$

In Equations (2)-(4), % $C_1$ and % $C_2$ are volumetric fractions. Thus, the properties of the NNCOC may be tailored by altering the ratio of its components. The optical, thermal and mechanical properties of a lens 110 may therefore be optimized through a judicious choice of starting materials, as demonstrated further below.

Figure 4:
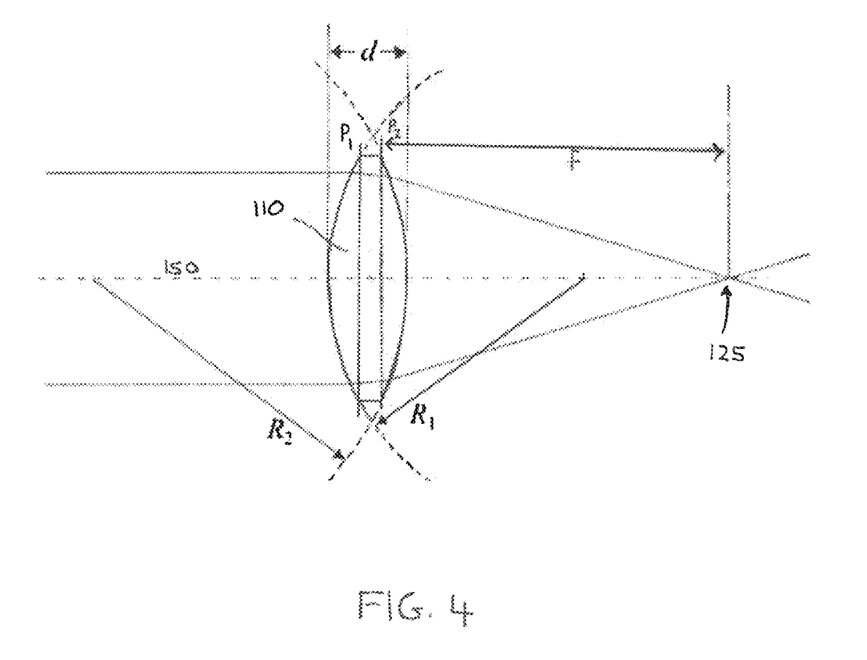
FIG. 4 is a schematic diagram of one example of a positive (converging) lens.

Using this prediction as a first approximation, the thin lens equation (Equation (5) below) can be used to estimate the change in focal length of a NNCOC lens with respect to temperature (df/dT). The thin lens equation is used to approximate the focal length of a lens when the thickness of the lens is small relative to the focal length. Referring to FIG. 4, the thin lens equation for $R_1 = -R_2$ (i.e., both sides of the lens have equal and opposite curvatures) is given by:

$$f = \frac{R}{2(n-1)} \tag{5}$$

In FIG. 4 and Equation (5), f is the effective focal length of the lens 110 measured from the rear principal plane P2 (the front, P1, and rear, P2, principal planes are shown in FIG. 4 located equidistant from the front and rear vertex) of the lens to the focal point 125 along an axis 150, d is the thickness of the lens, R is the radius of curvature of the lens, and n is the index of refraction. Accounting for temperature dependence, Equation (5) can be rewritten:

$$f(t) = \frac{R(t)}{2(n(t)-1)} \tag{6}$$

In Equation (6) both the shape of the lens and the refractive index are temperature dependent.

As discussed above, for a two-component nano-nano composite, R and n are based on a weighted average of the properties of the two component materials, $C_1$ and $C_2$. Accordingly, at temperature T, $$n = \left(n_1 + \Delta T * \frac{dn_1}{dT}\right) * (\% C_1) + \left(n_2 + \Delta T * \frac{dn_2}{dT}\right) * (\% C_2) \tag{7}$$

$$R = (\alpha_1 * (\% C_1) + \alpha_2 * (\% C_2)) * \Delta T + 1 \tag{8}$$

where n is the combined index of refraction based on the material composition, $n_1$ and $n_2$ are the refractive indices of the component materials $C_1$ and $C_2$, respectively, at a given temperature/wavelength, $\alpha_1$ and $\alpha_2$ are the coefficients of thermal expansion of the two component materials, respectively, at some temperature, $dn_i/dT$ is the temperature dependent index of refraction for each of the two component materials, and as above, % $C_1$ and % $C_2$ are volumetric fractions. The +1 is added in Equation (8) to account for an initial lens radius.

Substituting Equations (7) and (8) into Equation (5) and taking the first derivative with respect to temperature to determine how the effective focal length changes with temperature, yields:

$$\frac{df}{dT} = \frac{\% C_2 * \alpha_2 + \% C_1 * \alpha_1}{2\left(\left(n_1 + \Delta T * \frac{dn_1}{dT}\right) * \% C_1 + \left(n_2 + \Delta T * \frac{dn_2}{dT}\right) * \% C_2 - 1\right)} - \frac{((\% C_2 * \alpha_2 + \% C_1 * \alpha_1) * \Delta T + 1) * \left(\% C_2 * \frac{dn_2}{dT} + \% C_1 * \frac{dn_1}{dT}\right)}{2\left(\left(n_1 + \Delta T * \frac{dn_1}{dT}\right) * \% C_1 + \left(n_2 + \Delta T * \frac{dn_2}{dT}\right) * \% C_2 - 1\right)^2} \tag{9}$$

Equation (9) can be written more concisely as:

$$\frac{df}{dT} = \frac{\% C_2 * \alpha_2 + \% C_1 * \alpha_1}{2(n-1)} - \frac{R * \left(\% C_2 * \frac{dn_2}{dT} + \% C_1 * \frac{dn_1}{dT}\right)}{2(n-1)^2} \tag{10}$$

The following substitutions may be made:

$$\alpha = \% C_1 * \alpha_1 + \% C_2 * \alpha_2 \tag{11}$$

$$n = n_0 + \frac{dn}{dT} * \Delta T \tag{12}$$

$$\frac{dn_0}{dT} = \% C_2 * \frac{dn_2}{dT} + \% C_1 * \frac{dn_1}{dT} \tag{13}$$

Making these substitutions in Equation (10) yields:

$$\frac{df}{dT} = \frac{\alpha}{2\left(n_0 + \frac{dn_0}{dT} * \Delta T - 1\right)} - \frac{R * \frac{dn_0}{dT}}{2\left(n_0 + \frac{dn_0}{dT} * \Delta T - 1\right)^2} \tag{14}$$

According to one embodiment, by setting df/dT=0, Equation (14) may be solved for the component material properties that may provide a lens with a temperature-stable focal length. Thus, setting df/dT=0 in Equation (14) and simplifying yields:

$$\alpha = \frac{R*\frac{dn_0}{dT}}{\left(n_0 + \frac{dn_0}{dT}*\Delta T\right) - 1} \quad (15)$$

Figure 5:
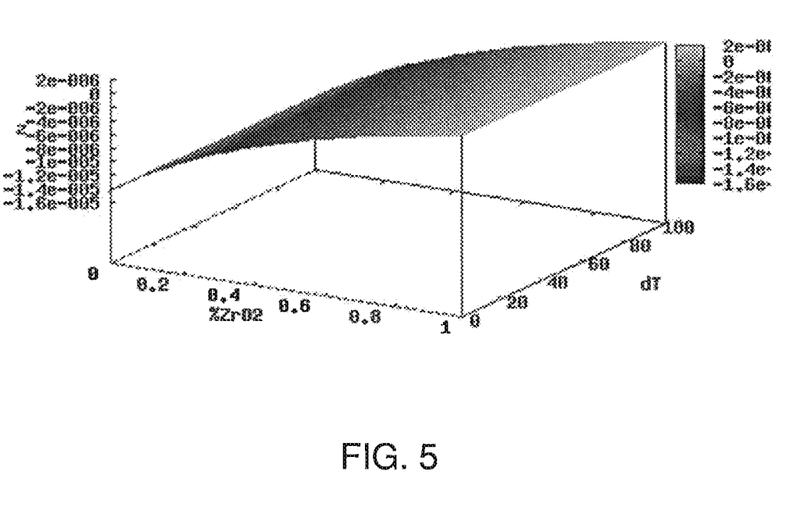
FIG. 5 is a graph showing composition on one axis, temperature change ($\Delta T$) on another axis, and change in lens focal length with temperature (df/dT) on the vertical axis, according to aspects of the invention.

In a simulation of Equation (15) performed using a mathematical analysis program called Maxima, it was determined that a NNCOC composition of Magnesium oxide (MgO) and Zirconium oxide (ZrO$_2$), with MgO being 81% by volume of the compound, has a df/dT~0. FIG. 5 illustrates a three dimensional graph of composition, change in temperature ($\Delta T$), and df/dT. It can be seen that the majority of this plot lies below df/dT=0.

In one example in which only the initial df/dT quantity is of interest, it may be assumed that $\Delta T$ is infinitesimally small, since the actual change in temperature at any given time is not important for this example. Accordingly, Equation (15) becomes:

$$\alpha_{lens} = \frac{\frac{dn_0}{dT}}{n_0 - 1} \quad (16)$$

Figure 6:
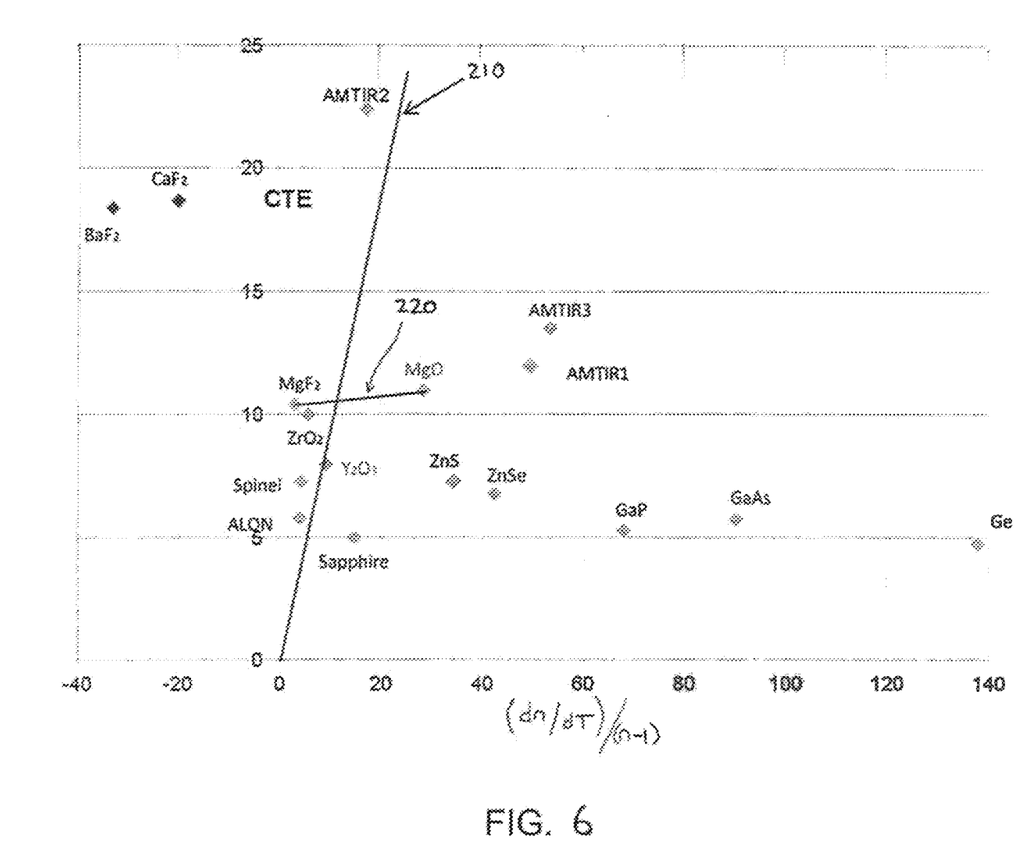
FIG. 6 is a graph illustrating various materials and a method of selecting component materials for a NNCOC lens according to aspects of the invention.

Equation (16) specifies properties for a NNCOC material that may be used to create a lens having a focal length that does not change appreciably, at least over a temperature range of interest. To determine component materials with properties that, when combined to form a NNCOC, will provide a composition that can result in a lens with df/dT, a graph may be plotted of $\alpha_{lens}$ as a function of $$\frac{\frac{dn_0}{dT}}{n_0 - 1},$$

as illustrated in FIG. 6. In FIG. 6, line 210 represents the solutions for df/dT=0. If a line, such as line 220, can be drawn between two materials on the graph which intersects line 210, then the composition of these two materials may have a df/dT of approximately zero. Thus, the component materials for a NNCOC may be selected to achieve a lens having approximately a zero change in focal length over a certain temperature range.

According to another embodiment, a NNCOC material may be selected and produced that may be used to provide a lens that self-compensate for temperature-induced changes in the mount or housing of the lens system. In this example, a df/dT of zero may not necessarily be desirable. Rather, it may be desirable to select df/dT of the lens to compensate for the thermal expansion of the mount, and thus hold an image position stable over temperature. For example, df/dT=$-\alpha_{mount}$. Accordingly, Equation (16) may be rewritten as:

$$\delta = \frac{\frac{dn_0}{dT}}{n_0 - 1} - \alpha_{lens} \quad (17)$$

In Equation (17), $\delta$ is a thermo-optic coefficient which describes the change in focal length with respect to temperature; similar to the manner in which cc describes changing length or volume with temperature.

Equation (17) may be derived from Equation (5) as follows:
Taking the first derivative with respect to temperature to determine how the effective focal length changes with temperature yields:

$$\frac{df}{dT} = \frac{\frac{dR}{dT}}{2(n-1)} - \frac{R*\frac{dn}{dT}}{2(n-1)^2} \quad (18)$$

Dividing by R, Equation (18) can be rewritten as:

$$\frac{1}{R}*\frac{df}{dT} = \frac{1}{R}*\frac{\frac{dR}{dT}}{2(n-1)} - \frac{\frac{dn}{dT}}{2(n-1)^2} \quad (19)$$

Defining $$\alpha_{lens} = \frac{1}{R}\frac{dR}{dT}$$

and $\beta$=dn/dT, and substituting into Equation (19) yields:

$$\frac{1}{R}*\frac{df}{dT} = \frac{\alpha_{lens}}{2(n-1)} - \frac{\beta}{2(n-1)^2} \quad (20)$$

Multiplying by R, and referring again to Equation (5) yields:

$$\frac{df}{dT} = \alpha_{lens}*f - \frac{R\beta}{2(n-1)^2} \quad (21)$$

Equation (21) can be rewritten as:

$$\frac{df}{dT} = \alpha_{lens}*f - \frac{R}{2(n-1))}*\frac{\beta}{(n-1)} \quad (22)$$

Substituting Equation (5) into Equation (22) yields:

$$\frac{df}{dT} = \alpha_{lens}*f - f*\frac{\beta}{n-1} = f\left(\alpha_{lens} - \frac{\beta}{n-1}\right) \quad (23)$$

Defining $\delta$ as given in Equation (17), and substituting into Equation (23) results in:

$$\frac{df}{dT} = -\delta f \quad (24)$$

Thus, Equation (24) specifies that the change in focal length is equal and opposite to the thermo-optic coefficient which describes the change in focal length with respect to temperature multiplied by the original focal length. Accordingly, knowing df/dT, appropriately selecting $\delta$, or vice versa, may provide a system with a constant focal length, or image position, over a certain temperature range.

Figure 7:
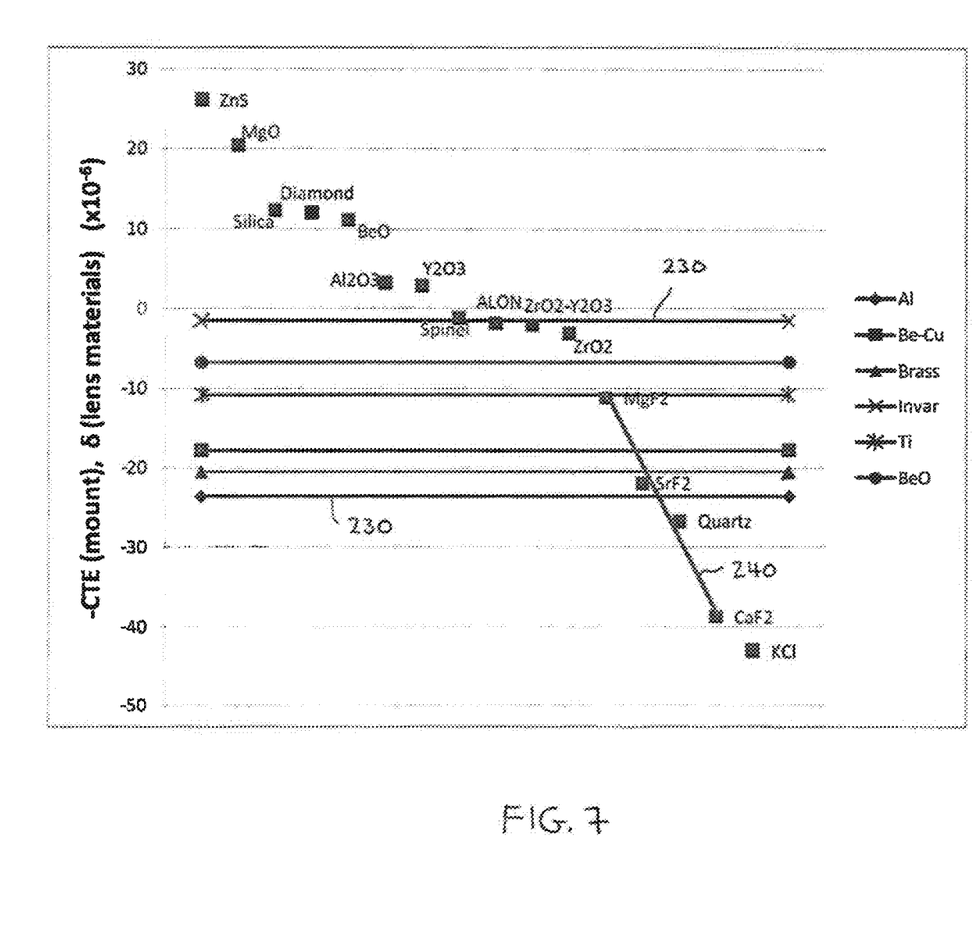
FIG. 7 is a graph illustrating various mount and lens materials and showing a tie-line for selecting component materials of a NNCOC lens according to aspects of the invention.

According to one embodiment, using Equations (24) and (17), df/dT of the lens can be matched to a mount material so as to construct a system in which the image position does not change appreciably over a selected temperature range. The requirement that $\delta = -\alpha_{mount}$ may limit the choice of NNCOC materials that can be used to construct the lens. In one example, plotting the $\delta$ of various potential lens materials on a graph with the $\alpha_{mount}$ of various potential mount materials may provide a mechanism for selecting appropriate mount and lens materials to achieve a system in which the image position is stable with temperature. For example, referring to FIG. 7, there is illustrated a graph of $\alpha_{mount}$ and $\delta_{lens}$ for several materials that may be used in infrared applications. These materials include, for example, Zinc sulfide (ZnS), Magnesium oxide (MgO) diamond, silica, Beryllium oxide (BeO), Aluminum oxide ($Al_2O_3$, also known as sapphire), Yttrium oxide ($Y_2O_3$), spinel, Aluminum oxynitride (ALON), Zirconium oxide ($ZrO_2$), $ZrO_2$—$Y_2O_3$ (a material in the Zirconia class of ceramics), Magnesium fluoride ($MgF_2$), Strontium fluoride ($SrF_2$), quartz, Calcium Fluoride ($CaF_2$) and Potassium chloride (KCl). This example list of materials excludes some semiconductor materials with very high values of $\delta$ and many fluorides that have negative values of $\delta$; however, this list is exemplary only and not intended to be limiting. The materials considered for any application may depend on the specifications of the particular application. FIG. 7 also illustrates several lines 230 that represent the $\alpha_{mount}$ of several different potential mount materials, including Aluminum, Beryllium-Copper (Be—Cu), brass, Invar (a nickel-steel alloy, 64FeNi), Titanium, and Beryllium oxide. These example mount materials range from Invar, having an extremely low coefficient of thermal expansion ($1.5 \times 10^{-6}$ per degree Celsius) to Aluminum which has a coefficient of thermal expansion of $23 \times 10^{-6}/°$ C. In FIG. 7, the y-axis (or vertical axis) represents $-\alpha_{mount}$ ($\times 10^{-6}/°$ C.) for the mount materials and $\delta$ ($\times 10^{-6}/°$ C.) for the lens materials. The x-axis (or horizontal axis) has no associated units or value.

According to one embodiment, a graph such as that illustrated in FIG. 7 may be used to assist a designer is selecting lens and mount materials for a given system. If the component materials for the lens NNCOC are appropriately selected and combined in the right proportions, they may compensate for the thermal expansion of an optical system. Depending on the materials chosen, the NNCOC may be able to compensate for a range of different mount materials simply by altering the composition proportions. Still referring to FIG. 7, in one example, drawing a "tie-line" 240 between two materials, for example, $MgF_2$ and $CaF_2$, as shown in FIG. 7, the volumetric composition of a NNCOC material made of the two selected component materials can be chosen by observing the intersection point(s) of the tie-line 240 and the line(s) 230 representing $\alpha_{mount}$ of one or more mount materials. As can be seen with reference to FIG. 7, in the illustrated example, a NNCOC comprising $MgF_2$ and $CaF_2$ can be selected to have a $\delta$ that matches the $\alpha_{amount}$ of any of Titanium, Brass, Aluminum or Beryllium-Copper (Be—Cu) mount, depending on the volume percentages of the two materials in the NNCOC. As noted above, the graph illustrated in FIG. 7 does not have a value associated with the horizontal axis. Therefore, the graph alone does not provide the volumetric proportions of the two lens material joined by the tie-line 240. Rather, the composition of the NNCOC lens material may be determined, after the two component materials are selected, based on the known properties of the two component materials and the following equations.

For example, Calcium Fluoride ($CaF_2$) has the following properties:

$n_1 = 1.41$ $\alpha_1 = 18.9 \times 10^{-6}/°$ C.

$dn/dT = -8.1 \times 10^{-6}/°$ C.

Magnesium Fluoride ($MgF_2$) has the following properties:

$n_2 = 1.35$ $\alpha_2 = 14 \times 10^{-6}/°$ C.

$dn/dT = 1 \times 10^{-6}/°$ C.

Applying Equation (17) subject to the desired condition, namely that $\delta = -\alpha_{mount}$ gives:

$$\frac{\frac{dn}{dT}}{n-1} - \alpha_{lens} = -\alpha_{mount} \quad (25)$$

Substituting Equations (2), (3) and (4) into Equation (25), and noting that since $C_1$ and $C_2$ are volumetric fractions, $C_2 = 1 - C_1$, produces:

$$\frac{C_1 * \frac{dn_1}{dT} + (1-C_1)\frac{dn_2}{dT}}{(C_1 n_1 + (1-C_1)n_2 - 1)} - (C_1\alpha_1 + (1-C_1)\alpha_2) = -\alpha_{mount} \quad (26)$$

Inserting the above-given properties for the two example materials into Equation (26), and assuming an Aluminum mount ($\alpha_{mount} = 23 \times 10^{-6}$) yields:

$$\frac{C_1(-8.1 \times 10^{-6}) + (1-C_1)(1 \times 10^{-6})}{(1.41 * C_1 + (1-C_1) * 1.35 - 1)} - \quad (27)$$
$$(C_1 * 18.9 \times 10^{-6} + (1-C_1) * 14 \times 10^{-6}) = -23 \times 10^{-6}$$

Solving Equation (27) for $C_1$ gives $C_1 = 0.38$. Thus, if a NNCOC composition is produced from Calcium Fluoride and Magnesium Fluoride, including 38% Calcium Fluoride by volume (and therefore 62% Magnesium Fluoride), the $\delta$ of the composite would be opposite and equal to the coefficient of thermal expansion of the Aluminum mount, and therefore there would be no change (or no appreciable change) if focal length due to temperature variations, creating an athermal optical system.

Figure 8:
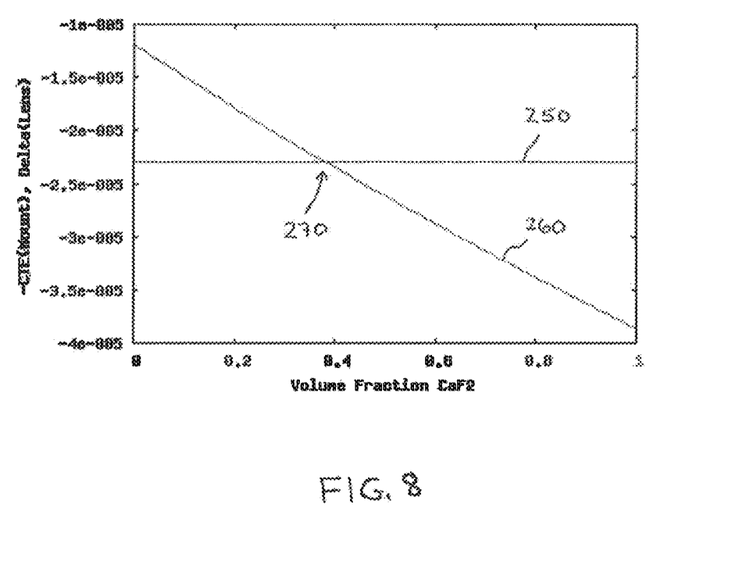
FIG. 8 is a graph showing the negative coefficient of thermal expansion of an Aluminum mount and the value of the thermo-optic coefficient of $CaF_2:MgF_2$, based on composition, according to aspects of the invention.

Referring to FIG. 8, there is illustrated a graph showing the coefficients of thermal expansion for a mount (line 250), and the thermo-optic coefficient $\delta$ for a lens material (line 260) as a function of the composition of the lens material. In the illustrated example, the mount material is Aluminum, and therefore the coefficient of thermal expansion, $\alpha_{mount}$ is independent of the composition of the lens material. In the illustrated example, the lens material is a NNCOC including component materials Calcium Fluoride ($CaF_2$) and Magnesium Fluoride($MgF_2$). The horizontal axis of the graph in FIG. 8 is the volume fraction of $CaF_2$ in the lens material. The intersection point 270 of line 250 with line 260 indicates the composition of the lens material at which $\delta = -\alpha_{mount}$. As discussed above, in this example, that composition is approximately 38% $CaF_2$.

The above-discussed examples illustrate that, based on mathematical models, NNCOC lenses may be produced that have temperature-stable focal lengths (df/dT≈0) and/or are able to compensate for thermal expansion/contraction of the lens mount. For example, as discussed above, a MgO:ZrO$_2$ NNCOC lens (e.g., 81% MgO and 19% ZrO$_2$ by volume) may be produced having df/dT equal to, or approximately equal to, zero. As also discussed above, a CaF$_2$:MgF$_2$ NNCOC lens may be produced that has df/dT set to compensate for the α(T) of an aluminum or steel mount. Using other component materials for a NNCOC lens may allow a designer to compensate for thermal properties of a composite or plastic mount, potentially allowing additional cost and weight savings in an optical system. Due to the mechanically strong nature of many NNCOC materials, these materials may further be used to construct the mount instead of or in addition to the lens, allowing further flexibility in the system design. A NNCOC compound of MgO:Y$_2$O$_3$ has been developed for missile domes; however, this material may not be practical for many optical system or lens applications because the values of δ for this material are only able to compensate for a mount material having a negative coefficient of thermal expansion (i.e., contracts with increasing temperature), and such materials are not commonly used in optical system applications.

As discussed above, NNCOC materials may also be used to produce other optical components of an optical system, for example, reflective optical components such as mirrors. For example, the curvature of a mirror surface may change with temperature, similar to the manner in which a refractive lens changes shape with temperature. For example, the temperature-dependent coefficient of thermal expansion of the mirror material may result in corresponding temperature-dependent changes in the curvature of the reflective surface of the mirror. Accordingly, the mirror may be constructed using an NNCOC to compensate for such thermal variations, as discussed above with respect to examples of NNCOC lenses. NNCOC mirrors may be constructed from a wide variety of materials depending on the desired properties, for example, transparency or opaqueness at a particular wavelength. In some examples, the mirror material may be selected to achieve a match in coefficient of thermal expansion with the mirror mounting structure, as discussed above. Other mirror properties, such as specific stiffness (modulus/density), strength, fracture toughness, processability, and temperature-dependent optical properties, may be considered in selecting the NNCOC component materials. In one example, if the selected material has insufficient reflectivity at a particular wavelength for a given application, the mirror may be additionally coated with a reflective coating. According to certain embodiments, a reflective optical system may be athermalized by using NNCOC materials for the mirror(s) and optionally the mirror mounting structures, as discussed above with respect to optical systems including refractive elements (such as the above-discussed lenses). Constructing the mirror from the same material as the mounting structure may provide an advantage in that bonding or otherwise attaching the mirror to the mount may be easier as there is no thermal mismatch between the mirror and the mount.

Figure 9:
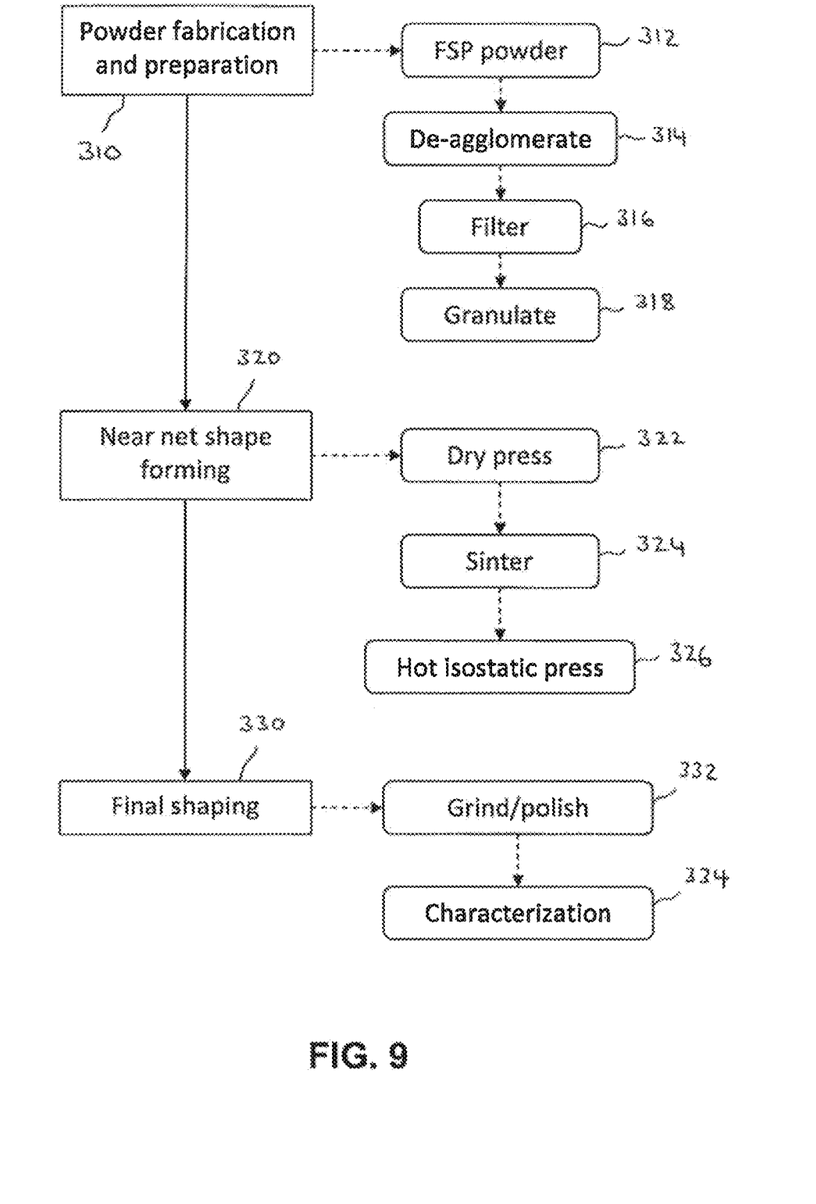
FIG. 9 is a flow diagram of one example of a method of making a NNCOC optical component according to aspects of the invention.

Referring to FIG. 9 there is illustrated a flow diagram of one example of a method of manufacturing an optical component, such as a lens or mirror, from a NNCOC material, according to one embodiment. Step 310 includes the fabrication and preparation of a NNCOC powder that will be used to produce an optical component. As discussed above, in one embodiment the NNCOC powder may be formed using a flame spray pyrolysis process (step 312). Flame spray pyrolysis (FSP) is a technique for the synthesis of high purity nano-particle materials with controlled particle size and crystallinity in a single step, and has been used in a variety of applications.

Figure 10:
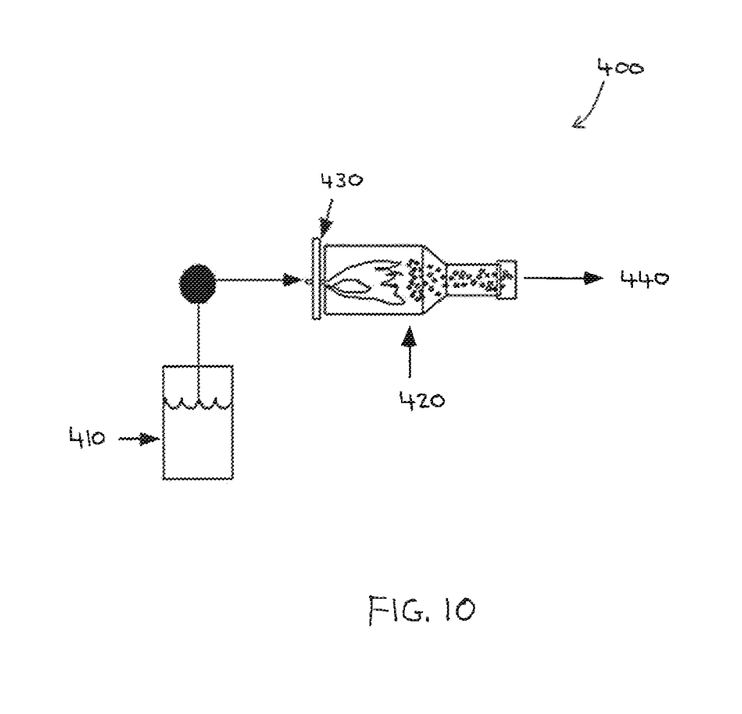
FIG. 10 is a block diagram illustrating a flame spray pyrolysis apparatus for producing a NNCOC powder.

FIG. 10 illustrates an example apparatus 400 that may be used to perform the flame spray pyrolysis process 312. The apparatus 400 includes a precursor solution reservoir 410 coupled to a quartz combustion chamber 420 via a cooling collar 430. A solution including the two selected component materials is collected in the reservoir 410 and fed into the combustion chamber 420. The combustion chamber also receives a gaseous fuel (not shown) used to achieve combustion inside the chamber. A solution 440 from the combustion chamber 420 includes a nanopowder including the two component materials along with the by-products of combustion namely carbon-dioxide (CO$_2$) and water vapor (H$_2$O). The solution 440 is fed to a separation device (not shown) such as, for example, a centrifuge, a cyclone separator, electrostatic precipitators, filters, and thermoplastic sampling devices, among others, where the nanopowder is separated out and collected for further processing. In some examples, thenanopowder may be in solution with a liquid at this stage.

Referring again to FIG. 9, once the solution 440 containing the nanopowder has been produced, it may be ground and mixed, for example in a mill or similar device, to break up any "clumps" (step 314). The solution 440 may then be filtered (step 316) to remove impurities and/or any large particles (e.g., those exceeding a maximum desired particle size for the NNCOC material) from the solution. A granulation step 318 may include removing liquid from the solution and drying the powder. Next, the nanopowder may undergo initial shape-forming steps to produce the rough shape of the optical component (step 320). This initial shaping step 320 may achieve near to the net (or final) shape of the optical component. Step 320 may include a dry press step 322 which includes packing the nanopowder into a mold and applying pressure to remove voids. A sintering step 324 may include applying heat to melt the powder inside the mold. The shaping process 320 may further include applying a hot isostatic press (step 326). In this step 326, very high pressure may be applied to the melted powder to squeeze out any remaining voids and make the material "fully dense." The base lens produced at the end of step 320 may then be processed in a final shaping and finishing step 330 to produce the finished optical component. This step 330 may include a precision grinding and/or polishing step 332 in which any excess material is removed from the optical component, and the surface(s) are polished to achieve an optical finish. Step 330 may further include a characterization step 334 of the optical component's mechanical and optical properties to verify that the optical component meets specifications.

Thus, a refractive (e.g. a lens) or reflective (e.g., a mirror) optical component (and optionally a lens mounting structure) may be constructed from a NNCOC material having its constituent materials, and the proportions thereof, selected to achieve desired thermal characteristics for the overall composite material. Using such an optical component may allow a designer to optimize thermal, optical and mechanical performance of an optical system. For example, designing lenses using NNCOC materials according to various embodiments may allow the designer to control the change in focal length and image position with temperature, as discussed above. In addition, tailoring a lens specifically for a particular optical system may greatly reduce the cost and time associated with athermalization. As discussed above, conventional passive athermalization involves complex mount structures that use materials with high coefficients of thermal expansion to hold the lens in position and expand opposite to thermal expansion of the housing. Conventional active athermalization techniques involve the use of motors and tracks to keep the lens in focus, greatly increasing the weight and complexity of the optical system. In contrast, by using NNCOC materials to design lenses specifically for a given optical system, a designer may select a suitable mount, and then tailor the lens to achieve desired properties for the overall system. As a result, NNCOC lenses according to various embodiments may allow for less complex athermal optical systems for the UV, visible SWIR and MWIR wavelength bands. With the ability to design a lens with desired properties, fewer optical elements may be used to compensate for thermal effects, resulting in a smaller, less expensive and less complex optical system compared to conventional athermal systems.

According to another embodiment, NNCOC materials may be tailored by suitably selecting and controlling the ratio of its component materials, as discussed above, to produce custom materials for achromatizing optical systems in the infrared and/or visible wavelength bands. For example, using the processes discussed above, an achromatic lens may be produced. An achromatic lens (or achromat) is a lens that is designed to limit the effects of chromatic and spherical aberration, and bring two wavelengths (for example, red and blue) into focus in the same plane. Chromatic aberration of a single lens causes different wavelengths of light to have differing focal lengths. A common achromat is the achromatic doublet, which is composed of two individual lenses made from glasses with different amounts of dispersion. The two lens elements are mounted next to each other, for example cemented together, and shaped so that the chromatic aberration of one is counterbalanced by that of the other.

In one example of an achromatic doublet, one of the two lenses has positive optical power $\phi$ ($\phi=1$/focal length), and the other negative, with the optical power of the combination equal to the sum of the two. If $\phi_1$ and $\phi_2$ are the optical powers of the two lenses in the doublet, $V_{11}$ and $V_{12}$ are the volumetric fractions of the two component NNCOC materials in the first lens/element of the doublet, $V_{21}$ and $V_{22}$ are the volumetric fractions of the two component NNCOC materials in the second lens/element of the doublet, and $v_1$ and $v_2$ are the dispersions (Abbe numbers) of the two component NNCOC materials, then the doublet will be an achromat if the following equations are obeyed:

$$\frac{\phi_1}{\phi_1+\phi_2} = \frac{(v_2-v_1)V_{12}+v_1}{(v_2-v_1)V_{12}-(v_2-v_1)V_{22}} \quad (28)$$

$$\frac{\phi_2}{\phi_1+\phi_2} = -\frac{(v_2-v_1)V_{22}+v_1}{(v_2-v_1)V_{12}-(v_2-v_1)V_{22}} \quad (29)$$

Thus, NNCOC materials offer a degree of freedom (namely, the volume fractions of the constituent materials in each element) that can be used to more easily design achromatic doublets and other achromatized optical systems.

NNCOC lenses and/or other optical components may be used and beneficial in a wide variety of applications. For example, the use of NNCOC components may allow for target acquisition and tracking electro-optic systems that can hold image position stable over large temperature ranges without requiring complex athermalization schemes. Similarly, NNCOC components may allow for target acquisition and tracking electro-optic systems and/or machine vision and inspection optics that can hold an effective focal length constant over large temperature ranges, which may be particularly beneficial in applications where it is important that image size does not change with temperature. For example, this may be beneficial in systems where software is used to classify items in an image, and classification errors can result from items changing size in the image with changes in temperature. Fluorides enable transmission into the deep ultraviolet (DUV) bands. Presently, two materials, namely, silica and Calcium Fluoride ($CaF_2$) are commonly used in DUV photolithography systems, with silica being the dominant material. A NNCOC material which may provide achromatization in the DUV spectral band may be greatly beneficial in photolithography applications, as well as wafer and reticle inspection applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical system comprising at least one athermal lens integrally formed of a nano-nano composite optical ceramic (NNCOC) material having a crystalline structure and comprising a first plurality of nanograins of a first component nanograin material having a first coefficient of thermal expansion, a first thermo-optic coefficient, and a first index of refraction, and a separate, second plurality of nanograins of a different second component nanograin material having a second coefficient of thermal expansion, a second thermo-optic coefficient, and a second index of refraction, each of the first and second pluralities of nanograins having a sub-micron grain size in a direction of light transmission through the at least one athermal lens, and a volumetric ratio of the first and second pluralities of nanograins in the nano-nano composite optical ceramic material being substantially non-varying throughout the at least one athermal lens and selected to achieve a substantially constant focal length of the optical system over an operating temperature range from about −40° C. to about 70° C., and based on a first relationship between the first coefficient of thermal expansion and the first index of refraction and a rate of change of the first index of refraction over the operating temperature range, and a second relationship between the second coefficient of thermal expansion and the second index of refraction and a rate of change of the second index of refraction over the operating temperature range, the crystalline structure of the nano-nano composite optical ceramic material obtained by sintering the first component nanograin material and the second component nanograin material and applying a hot isostatic press.

2. The optical system of claim 1, wherein the NNCOC material is substantially transparent in the infrared spectral band.

3. The optical system of claim 1, wherein the first and second component nanograin materials are selected from a group consisting of $ZrO_2$—$Y_2O_3$, Magnesium fluoride ($MgF_2$), Strontium fluoride ($SrF_2$), quartz, and Calcium Fluoride ($CaF_2$).

4. The optical system of claim 1, wherein the NNCOC material consists of first and second component nanograin materials with no host matrix material, and wherein the sub-micron grain size of each component nanograin material is less than approximately one tenth of a wavelength of light transmitted by the at least one athermal lens.

5. The optical system of claim 4, wherein the sub-micron grain size of each component nanograin material is approximately 100 nanometers.

6. The optical system of claim 1, further comprising a mount configured to hold the at least one athermal lens.

7. The optical system of claim 6, wherein the mount has a coefficient of thermal expansion, and wherein the volumetric ratio of the first and second pluralities of nanograins is selected to provide the at least one athermal lens with a thermo-optic coefficient that is substantially equal and opposite to the coefficient of thermal expansion of the mount.

8. The optical system of claim 1, wherein the volumetric ratio of the first and second pluralities of nanograins is selected to achromatize the optical system over a waveband of interest.

9. The optical system of claim 8, wherein the at least one athermal lens is a lens system including a first positive-powered athermal lens having a first optical power and a second negative-powered athermal lens having a second optical power, an optical power of the optical system being equal to the sum of the first optical power of the first lens and the second optical power of the second lens.

10. The optical system of claim 8, wherein the waveband of interest includes at least a portion of the visible spectral band.

11. The optical system of claim 1, wherein the first and second component nanograin materials are selected from the group consisting of Barium Fluoride ($BaF_2$), Gallium Phosphide (GaP), and Gallium Arsenide (GaAs).

12. A method of producing an athermal lens from a nano-nano-composite optical ceramic powder, the method comprising:
  determining a desired thermo-optic coefficient of the athermal lens;
  selecting at least two different component nanograin materials including a first plurality of nanograins of one of the at least two different component nanograin materials, each nanograin of the first plurality of nanograins having a first coefficient of thermal expansion, a first thermo-optic coefficient, and a first index of refraction, and a separate, second plurality of nanograins of another of the at least two different component nanograin materials, each nanograin of the second plurality of nanograins having a second coefficient of thermal expansion, a second thermo-optic coefficient, and a second index of refraction, and selecting a volumetric ratio of the at least two different component nanograin materials to achieve the desired thermo-optic coefficient based on a first relationship between the first thermo-optic coefficient and the first coefficient of thermal expansion, the first index of refraction, and a rate of change of the first index of refraction over an operating temperature range, and a second relationship between the second thermo-optic coefficient and the second coefficient of thermal expansion, the second index of refraction, and a rate of change of the second index of refraction over the operating temperature range;
  combining and processing the at least two different component nanograin materials to form the nano-nano-composite optical ceramic powder including the first plurality of nanograins of one of the at least two different component nanograin materials, and the separate, second plurality of nanograins of another of the at least two different component nanograin materials; and
  processing the nano-nano-composite optical ceramic powder to form the athermal lens, wherein the volumetric ratio of the at least two different component nanograin materials is substantially non-varying throughout the formed athermal lens and processing comprises sintering the at least two different component nanograin materials and applying a hot isostatic press to form a crystalline structure.

13. The method of claim 12, wherein determining the desired thermo-optic coefficient of the athermal lens further includes determining a coefficient of thermal expansion of a mount configured to hold the athermal lens, and selecting the thermo-optic coefficient of the athermal lens to be approximately matched to the coefficient of thermal expansion of the mount.

14. The method of claim 12, wherein combining and processing the at least two different component nanograin materials includes using a flame spray pyrolysis method to form the nano-nano-composite optical ceramic powder.

15. An optical system comprising at least one reflective athermal optical component integrally formed of a crystalline nano-nano composite optical ceramic (NNCOC) material having a crystalline structure and comprising at least two separate pluralities of nanograins formed of different component nanograin materials, including a first plurality of nanograins having a first coefficient of thermal expansion, a first thermo-optic coefficient, and a first index of refraction, and a second plurality of nanograins having a second coefficient of thermal expansion, a second thermo-optic coefficient, and a second index of refraction, each nanograin material having a sub-micron grain size, and a volumetric ratio of the at least two different nanograin materials in the crystalline nano-nano composite optical ceramic material being substantially non-varying throughout the at least one reflective athermal optical component and selected to achieve a substantially constant curvature of a reflective surface of the at least one reflective optical component over an operating temperature range from about −40° C. to about 70° C. of the optical system based at least in part on a first relationship between the first coefficient of thermal expansion and the first index of refraction and a rate of change of the first index of refraction over the operating temperature range, and a second relationship between the second coefficient of thermal expansion, the second index of refraction and a rate of change of the second index of refraction, the crystalline structure of the nano-nano composite optical ceramic material obtained by sintering the at least two separate pluralities of nanograins and applying a hot isostatic press.

16. The optical system of claim 15, wherein the at least one reflective optical component is a mirror.

* * * * *